United States Patent
Parry et al.

(10) Patent No.: US 6,798,934 B2
(45) Date of Patent: Sep. 28, 2004

(54) OPTICAL DATA THROUGHPUT PROTECTION SWITCH

(75) Inventors: Simon P. Parry, Harlow (GB); David W. Brown, Ottawa (CA); Bhupendra Patel, Aylmer (CA)

(73) Assignee: Nortel Networks Limited, St. Laurent (CA)

( * ) Notice: Subject to any disclaimer, the term of this patent is extended or adjusted under 35 U.S.C. 154(b) by 384 days.

(21) Appl. No.: 10/003,252

(22) Filed: Dec. 6, 2001

(65) Prior Publication Data

US 2003/0108271 A1 Jun. 12, 2003

(51) Int. Cl.[7] ............................. G02B 6/35; G02B 26/08
(52) U.S. Cl. ............................. 385/16; 385/44; 385/45
(58) Field of Search .......................... 385/16–23, 44–45

(56) References Cited

U.S. PATENT DOCUMENTS 5,337,377 A * 8/1994 Yamada et al. ............... 385/15
6,430,335 B1 * 8/2002 Carberry et al. .............. 385/20

* cited by examiner

Primary Examiner—Akm Enayet Ullah
Assistant Examiner—Jerry T Rahll (57) ABSTRACT

An optical data throughput protection switch is provided which provides access to a data-carrying first optical path in a manner which protects the data from interference from equipment utilizing said access, and eliminates optical connectors along the first optical path. The protection switch includes a controlling means and a controllable switch which is optically coupled to the first optical path the termination of a second optical path. The controllable switch is controlled by the controlling means and functions to enable and disable optical coupling between the termination, of the second optical path and the first optical path. This may be effected in a manner that allows access to the first optical path when there is no data traffic thereon, and denies access thereto when data is present, resulting in data throughput on the first optical path being protected from signals of the second optical path.

33 Claims, 6 Drawing Sheets

OPTICAL DATA THROUGHPUT PROTECTION SWITCH

FIELD OF THE INVENTION

This invention generally relates to optical transport systems, optical couplings to connect equipment and optical pathways therein, and more particularly an apparatus and system for optimizing and managing said connections, to provide access to an optical path and the protection of data throughput thereon.

BACKGROUND OF THE INVENTION

In optical transport systems is it desirable to eliminate optical connectors from the optical signal path in general to reduce the costs incurred by the requirement for the use of optical signal compensation and regeneration equipment. It is also desirable to allow systems to operate at higher optical powers which allows more data to travel greater distances. The elimination of connectors may be achieved by splicing the fibers to effect the desired optical couplings. Once equipment or optical components have been connected by way of physical splices of the optical fiber, however, it becomes impractical to disconnect the fiber to gain access to the optical data path for any reason.

One reason access to an optical data path is desirable, is that it allows for the assessment of the quality and health of a span of fiber with the use of optical test equipment such as an Optical Time Domain Reflectometer (OTDR). An OTDR, once optically coupled to a span of fiber, is used to measure the quality and health of the span of fiber by producing a series of high optical power pulses and measuring the light reflected and scattered back from the span of fiber. The high optical power pulses output by the OTDR, however, will interfere with any data on the fiber, causing bit errors.

It is therefore strongly desirable to engineer a solution which effects the elimination of optical signal connectors along the optical signal path and yet allows for access to that optical path in a manner which also protects the data from interference from equipment utilizing said access. Such a solution, for example, would allow system fiber to be measured with an OTDR during installation and configuration while preventing high optical power OTDR signals from inundating the system fiber when data is present.

SUMMARY OF THE INVENTION

This invention provides the desired solution by providing an optical data throughput protection switch which allows access to an optical path when there is no data traffic on the path, and denies access to the optical path when data is present, thereby protecting the data throughput.

The optical data throughput protection switch consists of a controllable switch and a controlling means. The controllable switch is optically coupled to a first optical path and also optically coupled to the termination of a second optical path. The controllable switch is controlled by the controlling means and functions to enable and disable optical coupling between the termination of the second optical path and the first optical path. The result is that the data throughput on the first optical path can be controllably protected from optical signals of the second optical path.

The optical data throughput protection switch simultaneously addresses both the desirability to reduce the number of optical connectors along an optical path while enabling access to that path. The optical data throughput protection switch, once spliced into the first optical path, does not require the use of connectors along the optical path, allowing for operation at higher powers. Access to the path, which would otherwise be impracticable in a spliced system, is attained by providing controlled access to the path through a controllable switch. Access to the optical path is controlled by attenuating, blocking or otherwise disabling optical signals of the second path from propagating to the first path when data is on the first path, and allowing optical signals of the second path onto the first path when there is no data traffic on the first path. In one embodiment the controlling means are input with traffic information of the first optical path, to decide when to allow and when to disable optical coupling between the first and second optical paths. In another embodiment the controlling means controls the controllable switch using an externally set software state variable, which allows for manually enabling or disabling optical coupling between the first and second optical paths. In this way users or high level systems can manually control the controllable switch. In another embodiment the controlling means has a first mode of operation in which it uses traffic information of the first optical path to decide when to allow and when to disable optical coupling between the first and second optical paths, and a second mode of operation in which it uses the externally set software state variable to control the controllable switch.

The optical data throughput protection switch, when used in conjunction with an OTDR optically coupled to the second optical path allows the system fiber to be measured with an OTDR during installation and configuration while preventing high power OTDR signals from inundating the system fiber when data is present.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
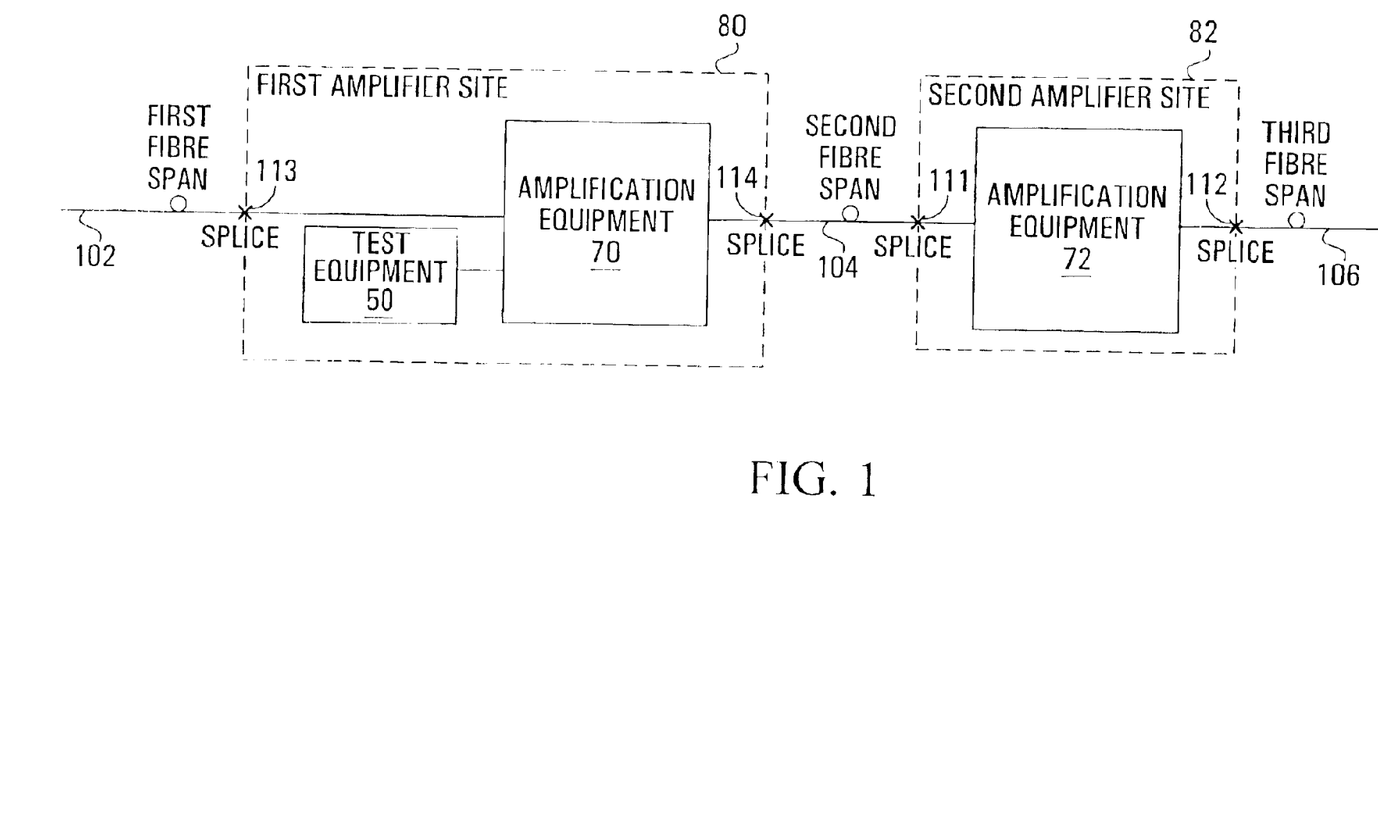
FIG. 1 is a block diagram illustrating an overview of a long haul amplifier system.

FIG. 1 shows an overview of a long haul amplifier system, which is the preferred context for implementation of an optical data throughput protection switch according to the invention. Amplifier equipment is located at different amplifier sites along the system to amplify an optical data signal input at one end of the system. Two such sites are illustrated in FIG. 1. A first amplifier site 80 is connected to a first fiber span 102, preferably by a high optical power compatible connection, such as a splice 113. The first amplifier site 80 comprises amplification equipment 70 which is optically coupled to test equipment 50. The first amplifier site is optically coupled to a second fiber span 104 by a splice 114. The second fiber span 104 is optically coupled to a second amplifier site 82 by a splice 111. A third fiber span 106 is optically coupled to the second amplifier site 82 by a splice 112. The second amplifier site comprises amplification equipment 72.

Figure 2:
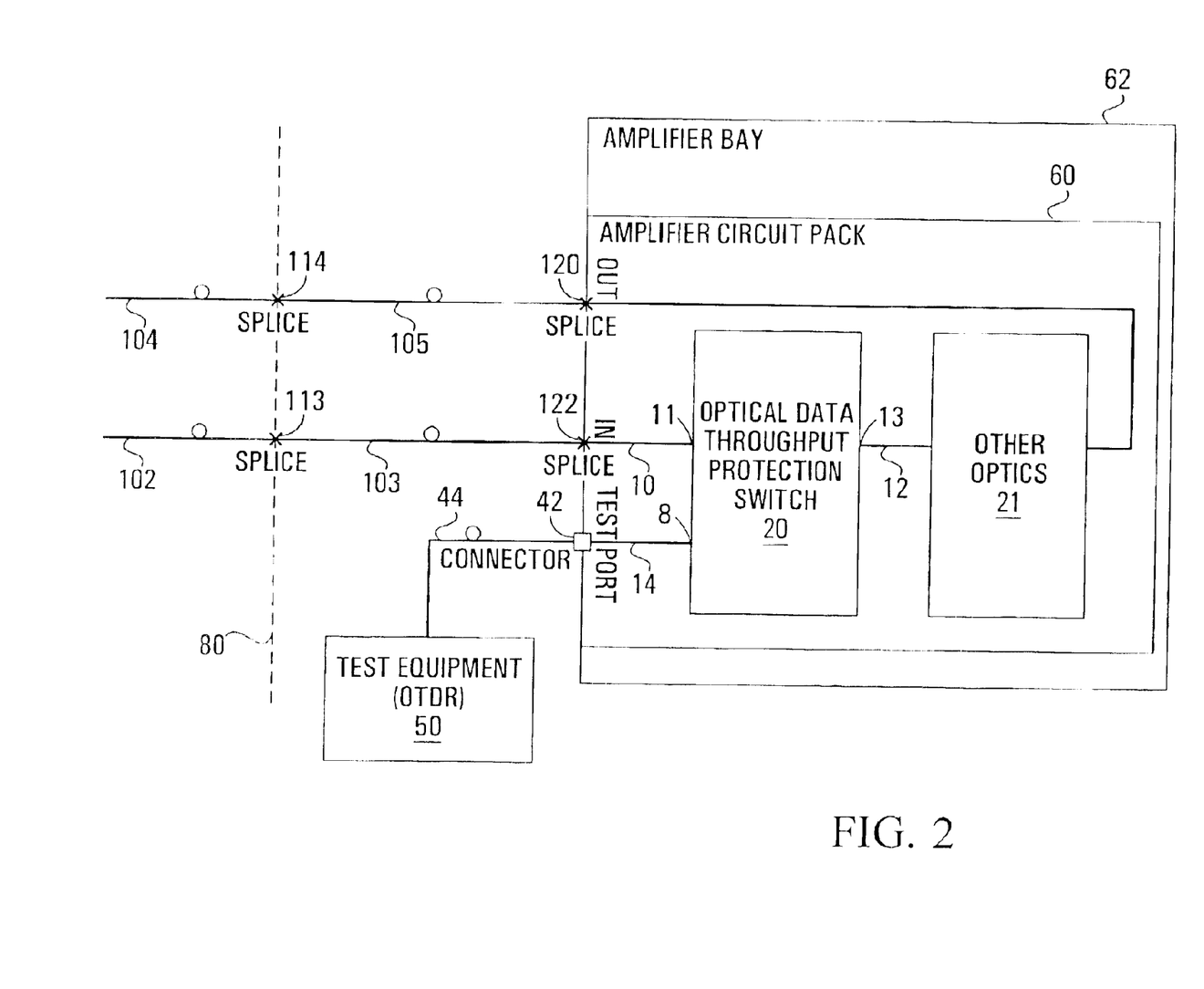
FIG. 2 is a block diagram illustrating an amplifier site within the amplifier system of FIG. 1.

FIG. 2 shows a more detailed view of the first amplifier site 80. As described above, the first fiber span 102 carrying data throughput is connected to the amplifier site 80 by splice 113. Splice 113 is connected to one end of a first fiber segment 103 the other end of which is connected to an amplifier circuit pack 60 through an input port 122 which in the preferred embodiments is a splice. The amplifier circuit pack 60 is housed in an amplifier bay 62, which is part of the amplification equipment 70 of FIG. 2. The amplifier circuit pack 60 has an output port 120 which in the preferred embodiment is a splice. Output port 120 is connected to one end of a second fiber segment 105, the other end of which is connected to a splice 114. As mentioned previously in connection with FIG. 1, splice 114 is connected to the second fiber span 104. A third port 42 (TEST PORT) on the amplifier circuit pack 60, which is preferably a high optical power compatible connector, connects the amplifier circuit pack 60 to the test equipment 50 such as an OTDR. Inside the amplifier circuit pack 60, an optical data throughput protection switch 20 has a first input 11 which is connected to the input port 122 by a first portion 10 of a first optical path, and a second input 8 connected to the TEST PORT 42 of the amplifier circuit pack 60, by a second optical path 14. The optical data throughput protection switch 20 has an output 13 which may be connected to an input of other optics 21, by a second portion 12 of the first optical path. Other optics 21 which typically comprises amplification equipment, such as Erbium Doped Fiber Amplifiers (EDFA), and any other optical elements normally found in an amplifier circuit pack, has an output optically coupled to output port 120. The optical data throughput protection switch 20 acts to allow high power pulses from the test equipment 50 propagating along the second optical path 14 to pass onto the data-carrying first optical path (10,12) when testing is desired and blocks these high power pulses from the test equipment 50 propagating along the second optical path 14 from entering onto the data-carrying first optical path when data traffic is present on the first fiber span 102.

Figure 3:
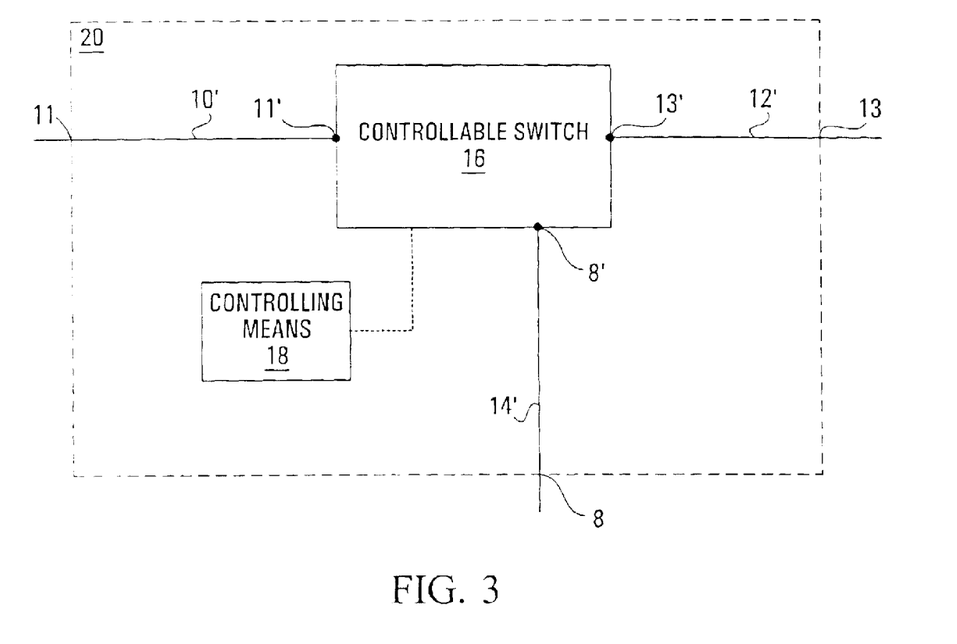
FIG. 3 is a block diagram illustrating a general representation of an optical data throughput protection switch according to the invention.

Referring now to FIG. 3, a block diagram representation of the optical data throughput protection switch, the optical data throughput protection switch 20 comprises a controllable switch 16, and a controlling means 18. The controllable switch 16 has an input 11' optically coupled by means of an optical path 10' to a first input 11 of the switch 20. It should be appreciated that the optical path 10' is a continuation of the first portion 10 of the first optical path. The switch 16 has an output 13' optically coupled by means of an optical path 12' to an output 13 of the switch 20. It should be appreciated that the optical path 12' is a continuation of the second portion 12 of the first optical path. The controllable switch 16 also has an input 8' optically coupled by means of an optical path 14' to a second input 8 of the switch 20. It should be appreciated that the optical path 14' is a continuation of the second optical path 14. The controllable switch 16 is controlled by the controlling means 18 to enable and disable optical coupling between the optical path 14' and the data-carrying optical path (10',12'). In this way data throughput along the first optical path (10,12) is controllably protected from optical signals which may be present on the second optical path 14.

Figure 4:
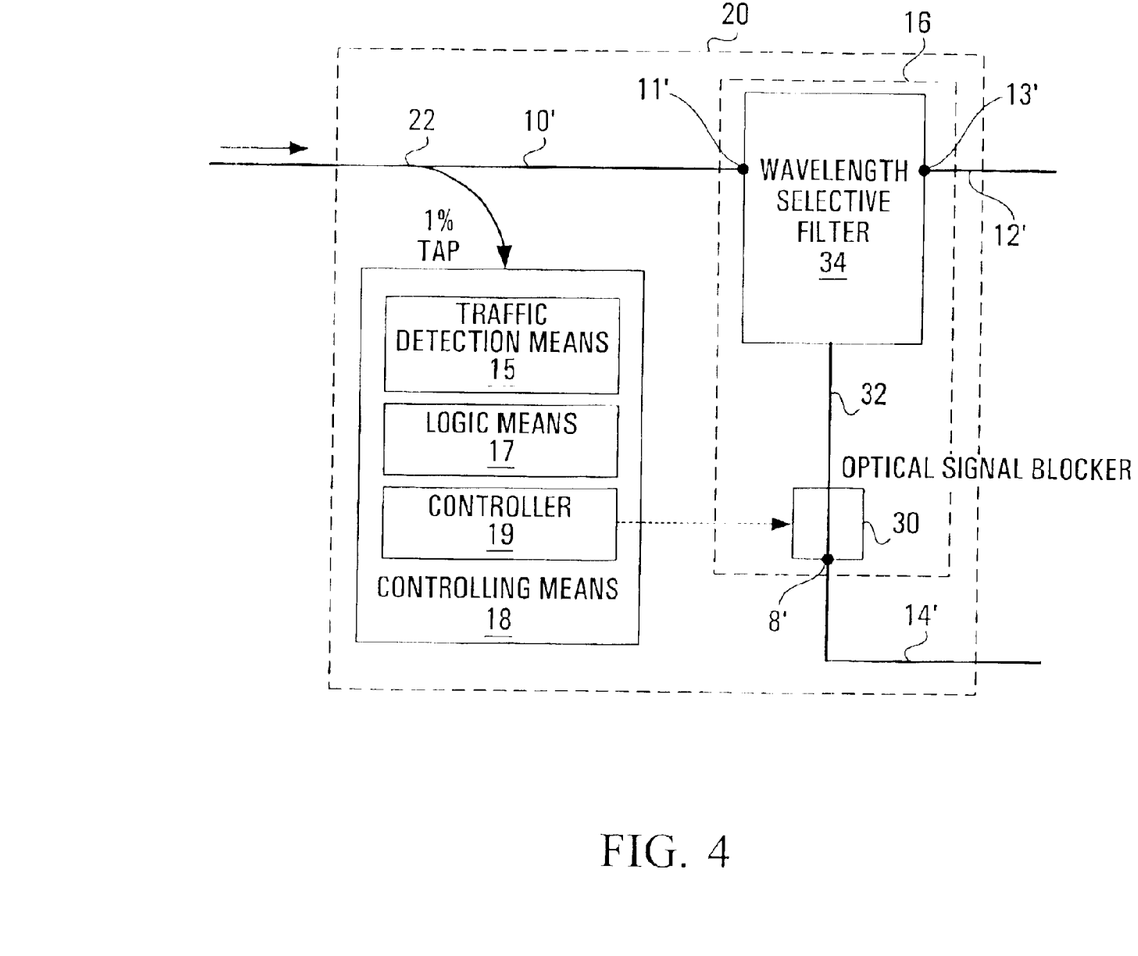
FIG. 4 is a block diagram illustrating a first preferred embodiment of the optical data throughput protection switch.

FIG. 4 shows a first preferred embodiment of the optical data throughput protection switch 20 illustrated generally in FIG. 3. In this embodiment, the controllable switch 16 includes a wavelength selective filter 34 which is optically coupled by the input 11' to the optical path 10', and optically coupled by the output 13' to the optical path 12'. The controllable switch 16 includes a controllable optical signal blocker 30 which is optically coupled by means of an optical path 32 to the wavelength selective filter 34. The wavelength selective filter is substantially transmissive from input 11' to output 13' in the optical carrier wavelength bands, causing as little loss as possible to the data signal propagating along the data-carrying optical path (10',12') as it traverses the filter, a consequence of which is that the signals in the optical carrier wavelength bands do not propagate from input 11' along the optical path 32. The optical carrier wavelength bands include the C-band, and the L-band illustrated in FIG. 6 and described below. The controllable optical signal blocker 30 is optically coupled by the input 8' to the optical path 14'. The wavelength selective filter 34 in the preferred embodiment is configured so that optical signals propagating along the optical path 32 of wavelengths particular to the OTDR 50, are routed through the input 11' to propagate along the optical path 10', or through the output 13' to propagate along the optical path 12', and operates so that those optical signals when scattered or reflected back towards the wavelength selective filter 34 from the elements and fibers farther down the continuation of optical path 10' or 12' respectively, are routed back along the optical path 32, so that they can be analyzed by the OTDR 50. In this way the wavelength selective filter may operate to enable testing of the fiber and associated equipment in either direction along the data-carrying first optical path (10,12).

In this preferred embodiment, the controlling means 18 is input with traffic information of the optical path 10' using a 1% tap 22. The controlling means 18 includes a traffic detection means 15, a logic means 17, and a controller 19. In the preferred embodiment the traffic detection means 15 includes a photodiode which converts optical power into electrical signals, and some logic capacity for processing the electrical signals. The processing could take place in hardware and/or software and typically employs a digital signal processor (DSP) or microprocessor. Of the many types of traffic detection that could be employed in the embodiment, occurring at different levels of resolution, information, and cost, one is discussed in association with this preferred embodiment. Two other types of traffic detection will be discussed below as alternative embodiments. This preferred embodiment uses low resolution traffic detection which simply assesses the presence or absence of optical signals above a set threshold, the threshold set somewhere between expected noise levels, and the expected power levels of optical signals to be detected. This type of detection provides no information about the optical signal other than its presence or absence, and is a relatively low-cost type of traffic detection. The logic means 17 of the controlling means 18 is input with information regarding the presence or absence of data throughput by the traffic detection means 15. The logic means 17 which may be implemented in hardware and/or software decides, based on the information provided to it regarding the traffic on the optical path 10', how to control the controllable optical signal blocker 30. In general the controller 19 controls the controllable optical signal blocker in accordance with the decision reached by the logic means 17. In the preferred embodiment, the controllable optical signal blocker 30 operates in one of two states, or is controlled to operate in one of two states. One state of the optical signal blocker 30 is the blocking state, in which the optical signal blocker 30 substantially blocks, attenuates or otherwise prevents optical signals propagating along the optical path 14' from propagating along the optical path 32. The second state of the optical signal blocker 30 is the transparent state, in which the optical signal blocker 30 substantially allows, transmits or otherwise enables optical signals propagating along the optical path 14' to propagate along the optical path 32. In this preferred embodiment, the optical signal blocker 30 is a Variable Optical Attenuator (VOA), also known as a Voltage Controlled Attenuator (VCA) controllable by electrical outputs of the controller 19. When in the transparent state, the VOA 30 preferably creates an optical signal loss of less than or equal to 1 decibel in the optical signals propagating onto the optical path 32 from the optical path 14'. When in a blocking state, the VOA 30 preferably creates a loss of greater than 30 decibels in the optical signals propagating onto the optical path 32 from the optical path 14'. In this preferred embodiment, when the traffic information from tap 22 indicates the presence of traffic on the optical path 10', the controlling means 18 operates to control the VOA 30 so that the VOA 30 goes into a first state and blocks or attenuates any optical signals propagating along optical path 14'. When the traffic information from tap 22 indicates the absence of traffic on the optical path 10', the controlling means 18 operates to control the VOA 30 so that the VOA 30 goes into a second state and allows or transmits any optical signals propagating along the optical path 14'.

Figure 5:
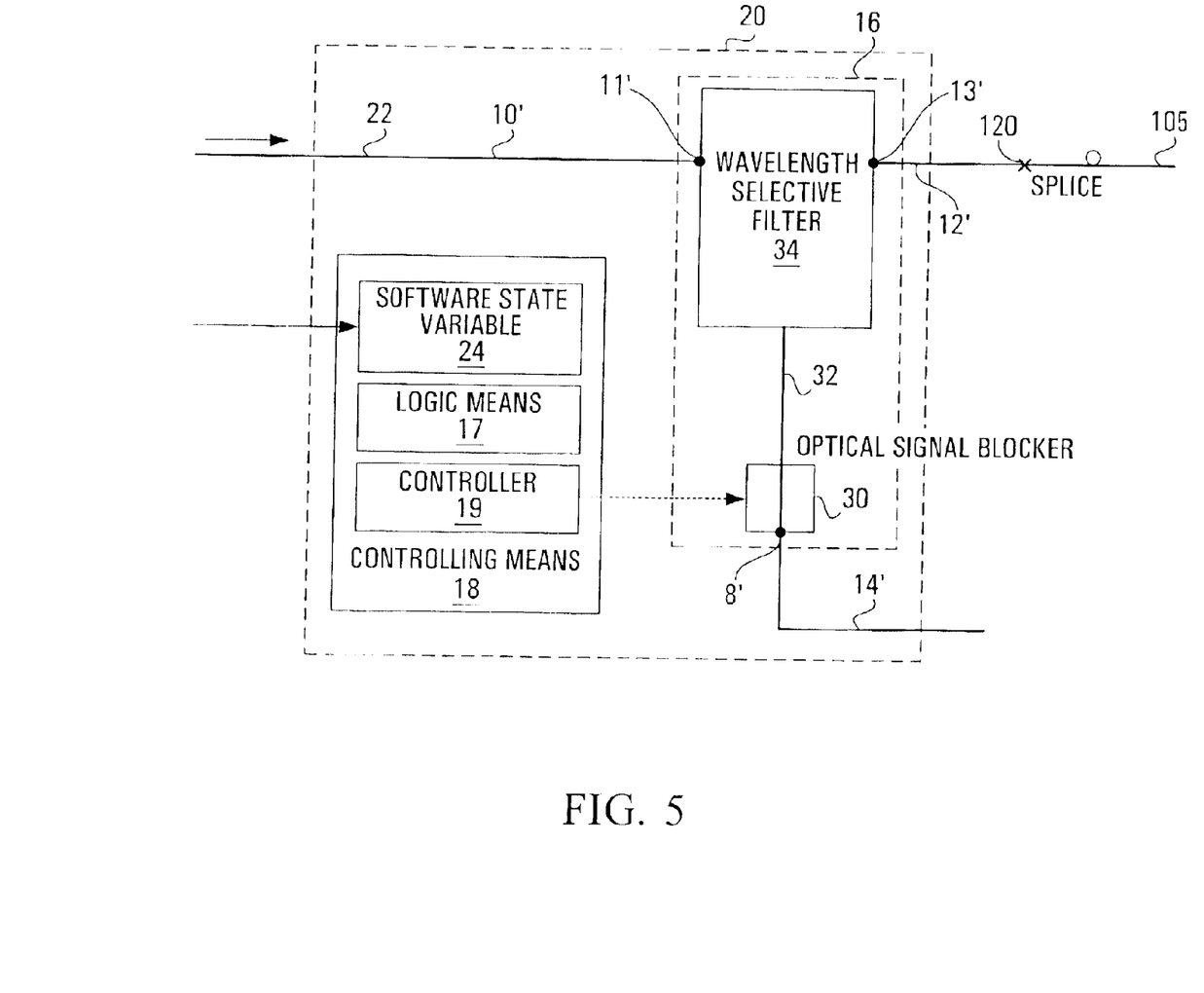
FIG. 5 is a block diagram illustrating a second preferred embodiment of the optical data throughput protection switch.

FIG. 5 shows a second preferred embodiment of the optical data throughput protection switch 20 illustrated generally in FIG. 3. In this embodiment, the controllable switch 16 has the same functionality and structure as that of the first embodiment of the optical data throughput protection switch. In this preferred embodiment, the controlling means 18 includes a software state variable 24 which is an active local setting, a logic means 17, and a controller 19. In the preferred embodiment the software state variable 24 is an active local setting which can be set externally. The preferred embodiment contemplates the setting of the software state variable 24 by an external operator, or a remote central network managing center, or a system which performs operation, management and monitoring of the network on a scale larger than a single amplifier site, or in general any other external entity which requires a mechanism to manually control the optical data throughput protection switch. The logic means 17 which may be implemented in hardware and/or software decides, based on the software state variable 24 how to control the controllable optical signal blocker 30. In general the controller 19 controls the controllable optical signal blocker 30 in accordance with the decision reached by the logic means 17. The controllable optical signal blocker 30 of this preferred embodiment is the same as that of the first preferred embodiment. In this preferred embodiment, when the software state variable 24 indicates that the optical signals propagating along the optical path 14' should be blocked, the controlling means 18 operates to control the VOA 30 so that the VOA 30 goes into a first state and blocks or attenuates any optical signals propagating along the optical path 14'. When the software state variable 24 indicates that the optical signals propagating along optical path 14' should not be blocked, the controlling means 18 operates to control the VOA 30 so that the VOA 30 goes into a second state and allows or transmits any optical signals propagating along the second optical path 14'.

Figure 6:
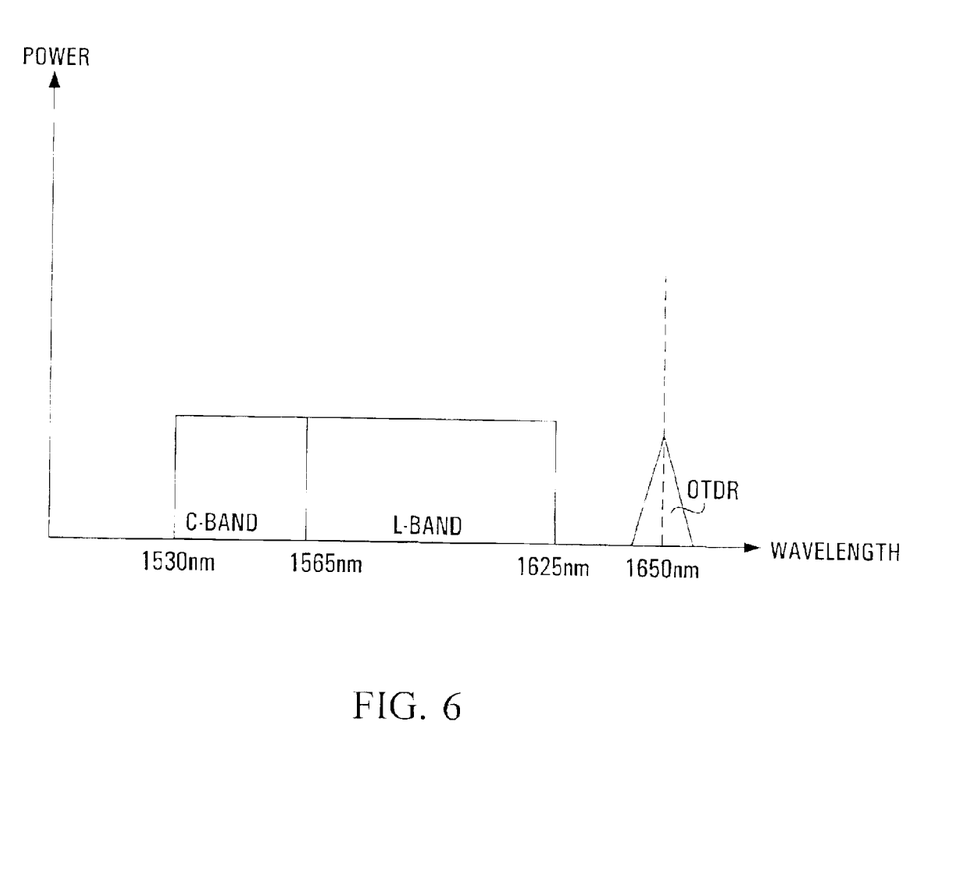
FIG. 6 shows the amplifier system spectrum.

FIG. 6 shows the amplifier spectrum indicating the wavelengths passed and amplified by an amplifier site, and also shows the wavelengths used in operating an OTDR. The wavelengths of the spectrum correspond to wavelengths that a wavelength selective filter would be tuned to in order to optimize performance of the optical data throughput protection switch 20 when used with an OTDR. The data carrier wavelength bands include the C-band (conventional band), the original cost effective band of wavelengths characteristic of standard erbium doped fiber amplifiers, and the L-band (long band), the typically less efficient more expensive to implement data carrier wavelength band. In the diagram, it can be seen that the wavelengths of the data carried in the C-Band and the L-band do not overlap wavelengths used by an OTDR. However if the high power pulses from the OTDR were allowed to propagate through the data-carrying fiber, due to the extreme power levels of the OTDR pulses, any data signals in the C-band and L-band would be interfered with. The frequency differentiation between the OTDR pulses and the data bands can be advantageously used to choose a wavelength selective filter 34 shown in FIGS. 4 and 5 of the first and second preferred embodiments, such that as described above, the traffic on the first fiber span 102 encounters as little loss as possible while traversing the filter 34, and OTDR pulses propagating along optical path 32 are directed down the optical fiber which is being tested.

There are many possible variations and embodiments of the invention which have not been illustrated, some of which will be described as follows.

Two other possible types of traffic detection that could be employed in other embodiments are medium and high resolution traffic detection. Medium resolution traffic detection is capable of detecting low frequency modulation of the carrier signal, such modulation carrying information often referred to as signal tags. This type of traffic detection is more reliable for detecting signals than low resolution traffic detection, and can extract information from the signal tags typically regarding the character and origin of optical signals. This type of detection provides more information than low resolution traffic detection, but is also more costly. High resolution traffic detection processes signals at the data level, extracting all of the data from the optical signal. This type of traffic detection can extract header information from the data stream, which contains detailed international standardized information. This type of traffic detection extracts the most information and is the most costly of the three types described. In utilizing these different types of traffic detection, the logic means 17 of the controlling means 18 is input with information regarding not only the presence or absence of data throughput, but also any other desired information from the traffic information extracted by the traffic detection means 15.

As a hybrid of the first and second preferred embodiments, shown in FIGS. 4 and 5, the controlling means 18 could comprise both a traffic detection means 15 input with traffic information from a tap 22, and a software state variable 24 which can be externally set. This embodiment could automatically control the optical data throughput protection switch 22 based on traffic information in a first mode of operation, while providing a manual override to a user in a second mode of operation, or an override to high level systems which could also change the software state variable.

In a more advanced hybrid embodiment, the controlling means 18, employing medium or high resolution traffic detection, uses priority information associated with optical signals on the data-carrying path to decide, in spite of a manual override request by a user or a high level system, to give priority to protecting the optical signal on the data-carrying path.

In one application of the second preferred embodiment, the software state variable is set by a network management center after receiving an alarm state indicating a failure and the need to use an OTDR to perform fault diagnosis on a particular span of fiber. The controlling means 18 controls the optical signal blocker 30 so that OTDR pulses are allowed to pass onto the optical path 32, to test the particular fiber span.

The connections 11' and 13' between the wavelength selective filter 34 and the data-carrying optical path (10', 12'), although made with physical splices in the preferred embodiment could be made with high optical power compatible connectors in alternate embodiments, as could the connections between the optical path 32 and the optical signal blocker 30, and connections between the optical path 32 and the wavelength selective filter 34.

In further alternative embodiments, the controllable optical signal blocker 30 could be an optical switch, which instead of attenuating optical signals simply directs the optical signal away from optical path 32, for example by dumping the optical signal to an unconnected or otherwise unused port. The optical signal blocker 30 could also be an optical shutter or beam stop which mechanically blocks optical signals by way of a metallic shutter which may be controllably placed into and out of the optical signal path. In general, the number of states the optical signal blocker 30 has, and the levels of transmission or blocking it can be set to can correspond to whatever number of states and whatever levels of transmission or blocking that are required by the particular application of the optical data throughput protection switch.

In the first and second preferred embodiments, the wavelength selective filter 34 connecting the optical path 32 to the data-carrying optical path (10', 12'), can in general be any three port optical component which has the desired optical characteristics of substantially complete transmission of optical signals in the C-band and L-band across 11' and 13', and appropriate routing of OTDR signals in the direction of the fiber to be tested.

It also should be noted that in place of the test equipment 50 shown as an OTDR, other kinds of test equipment such as an Optical Return Loss (ORL) Meter, or even non-test equipment may require controlled access to the data-carrying first optical path. The other test equipment or even non-test equipment can be connected to the second optical path 14 as the desired access to the first optical path dictates.

In the first and second preferred embodiments, the controllable switch 16 has been depicted as comprising a wavelength selective filter 34, an optical path 32, and a controllable optical signal blocker 30. In other embodiments, the controllable switch 16 may comprise a single element or other elements that function to controllably enable and disable optical signals propagating along the optical path 14', from entering the data-carrying optical path (10', 12'). Such a component could be a controllable 1-by-2 switch which could simply switch to optically couple input 11' with output 13' disabling any optical coupling between input 8' and both input 11' and output 13' when access to the data-carrying path is to be denied. When access to the data-carrying path is to be allowed, the 1-by-2 switch could operate to optically couple input 8' to either input 11' or output 13' to enable OTDR pulses to test the desired fiber, a side effect of which is the interruption of optical coupling between input 11' and output 13'. This embodiment is less preferred than the first and second preferred embodiments due to the risk of interfering with the data throughput in the case of a failure causing accidental switching of the 1-by-2 switch. The component could also be a three or four port Acousto-Optic Tunable Filter (AOTF), or in general any multiport tunable filter which is controllable to allow substantially complete transmission along the data-carrying path (10', 12'), allows OTDR pulses onto the data-carrying path (10', 12') when desired, and dumps the OTDR pulses to an unconnected or otherwise unused port or blocks them when data throughput along (10', 12') is to be protected.

It also should be appreciated that although the preferred embodiments may have implicitly described the data throughput as propagating in one direction along the data-carrying first optical path (10, 12), the invention is not limited to one way traffic, and contemplates that data throughput may be propagating in two directions along the data-carrying first optical path (10, 12).

What has been described is merely illustrative of the application of the principles of the invention. Other arrangements and methods can be implemented by those skilled in the art without departing from the spirit and scope of the present invention.

We claim:

1. An optical switch comprising:
   a controllable switch, and
   a controlling means,
   wherein said controllable switch is optically coupled to a first optical path and optically coupled to a termination of a second optical path, said controllable switch at all times providing an unbroken optical pathway along the first optical path, and controlled by the controlling means to enable and disable optical coupling between the termination of the second optical path and the first optical path.

2. The optical switch of claim 1 wherein the controllable switch enables said optical coupling of the termination of the second optical path to the first optical path by causing substantially complete transmission of optical signals of the second optical path to the first optical path, and disables said optical coupling of the termination of the second optical path to the first optical path by causing substantially complete attenuation of optical signals of the second optical path to the first optical path.

3. The optical switch of claim 1 wherein the controlling means controls the controllable switch using a software state variable which is externally modifiable.

4. The optical switch of claim 1 wherein the controlling means receives as input, traffic information of said first optical path, the controlling means controlling the controllable switch using said traffic information, and using a software state variable which is externally modifiable.

5. The optical switch of claim 1 wherein the controlling means comprises a traffic detection means, a software state variable which is externally modifiable, a logic means and a controller, the controlling means receiving as input, traffic information of said first optical path, the controlling means using said traffic information, and the software state variable to control the controllable switch.

6. The optical switch of claim 1 wherein the controllable switch is optically coupled to the first optical path by high optical power compatible connecting means.

7. The optical switch of claim 6 wherein the high optical power compatible connecting means are physical splices.

8. The optical switch of claim 1 wherein the controlling means receives as input, traffic information of said first optical path, for use in controlling the controllable switch.

9. The optical switch of claim 8 wherein the controlling means has a first mode of operation wherein the controlling means:
enables optical coupling between the termination of the second optical path and the first optical path when said traffic information indicates there is no data traffic on the first optical path; and
disables optical coupling between the termination of the second optical path and the first optical path when said traffic information indicates there is data traffic on the first optical path,
whereby data signals of the first optical path are controllably protected from signals from the second optical path.

10. The optical data protection switch of claim 9 wherein the controlling means has a second mode of operation wherein the controlling means controls the controllable switch using a software state variable which is externally modifiable.

11. The optical switch of claim 10 wherein the controlling means comprises a traffic detection means, a software state variable which is externally modifiable, a logic means and a controller, the controlling means receiving as input, traffic information of said first optical path, the controlling means using said traffic information, and the software state variable to control the controllable switch.

12. The optical switch of claim 9 wherein the controllable switch is optically coupled to the first optical path by high optical power compatible connecting means.

13. The optical switch of claim 12 wherein the high optical power compatible connecting means are physical splices.

14. The optical switch of claim 9 wherein the controllable switch enables said optical coupling of the termination of the second optical path to the first optical path by causing substantially complete transmission of optical signals of the second optical path to the first optical path, and disables said optical coupling of the termination of the second optical path to the first optical path by causing substantially complete attenuation of optical signals of the second optical path to the first optical path.

15. An optical switch comprising:
a controllable switch, and
a controlling means,
wherein said controllable switch is optically coupled to a first optical path and optically coupled to a termination of a second optical path, said controllable switch controlled by the controlling means to enable and disable optical coupling between the termination of the second optical path and the first optical path, and wherein the controllable switch further comprises:
a wavelength selective filter,
a controllable optical signal blocker,
a third optical path,
wherein the controllable optical signal blocker is optically coupled to said termination of the second optical path and is controlled by said controlling means to allow and block signals from the second optical path to the third optical path, the third optical path optically coupled to the controllable optical signal blocker and a second input of the wavelength selective filter, the wavelength selective filter optically coupled to the first optical path by a first input and a single output.

16. The optical switch of claim 15 wherein the controllable optical signal blocker operates to allow signals from the second optical path to the third optical path by causing substantially complete transmission of optical signals of the second optical path to the third optical path, and operates to block signals from the second optical path to the third optical path by causing substantially complete attenuation of optical signals of the second optical path to the third optical path.

17. The optical switch of claim 15 wherein the controllable optical signal blocker is an optical shutter.

18. The optical switch of claim 15 wherein the controllable optical signal blocker is a variable optical attenuator.

19. The optical switch of claim 18 wherein the second optical path is optically coupled to an Optical Time Domain Reflectometer, and wherein the wavelength selective filter is substantially transmissive along the first optical path between the first input and the second output of the wavelength selective filter to optical signals in a set of bandwidths corresponding to wavelengths of the carrier signals of the data throughput, the wavelength selective filter routing optical signals of wavelengths corresponding to a pulse from the Optical Time Domain Reflectometer between the second input of the wavelength selective filter and one of: the second input of the wavelength selective filter; and the single output of the wavelength selective filter.

20. An optical switch comprising:
a controllable switch, and
a controlling means,
wherein said controllable switch is optically coupled to a first optical path and optically coupled to a termination of a second optical path, said controllable switch controlled by the controlling means to enable and disable optical coupling between the termination of the second optical path and the first optical path, and wherein the second optical path is optically coupled to optical test equipment.

21. The optical switch of claim 20 wherein the optical test equipment is an Optical Time Domain Reflectometer.

22. An optical switch comprising:
a controllable switch, and
a controlling means,
wherein said controllable switch is optically coupled to a first optical path and optically coupled to a termination of a second optical path, said controllable switch controlled by the controlling means to enable and disable optical coupling between the termination of the second optical path and the first optical path, wherein the controlling means receives as input, traffic information of said first optical path, for use in controlling the controllable switch, wherein the controllable switch comprises:
a wavelength selective filter,
a controllable optical signal blocker,
a third optical path,
wherein the controllable optical signal blocker is optically coupled to said termination of the second optical path and is controlled by said controlling means to allow and block signals from the second optical path to the third optical path, the third optical path optically coupled to the controllable optical signal blocker and a second input of the wavelength selective filter, and the wavelength selective filter optically coupled to the first optical path by a first input and a single output.

23. The optical switch of claim 22 wherein the controllable optical signal blocker operates to allow signals from the second optical path to the third optical path by causing substantially complete transmission of optical signals of the second optical path to the third optical path, and operates to block signals from the second optical path to the third optical path by causing substantially complete attenuation of optical signals of the second optical path to the third optical path.

24. The optical switch of claim 22 wherein the controllable optical signal blocker is an optical shutter.

25. The optical switch of claim 22 wherein the controllable optical signal blocker is a variable optical attenuator.

26. An optical switch comprising:
    a controllable switch, and
    wherein said controllable switch is optically coupled to a first optical path and optically coupled to a termination of a second optical path, said controllable switch controlled by the controlling means to enable and disable optical coupling between the termination of the second optical path and the first optical path, wherein the controlling means receives as input, traffic information of said first optical path, for use in controlling the controllable switch, wherein the second optical path is optically coupled to optical test equipment.

27. The optical switch of claim 26 wherein the optical test equipment is an Optical Time Domain Reflectometer.

28. The optical switch of claim 25 wherein the second optical path is optically coupled to an Optical Time Domain Reflectometer, and wherein the wavelength selective filter is substantially transmissive along the first optical path between the first input and the second output of the wavelength selective filter to optical signals in a set of bandwidths corresponding to the wavelengths of the carrier signals of the data throughput, the wavelength selective filter routing optical signals of wavelengths corresponding to a pulse from an Optical Time Domain Reflectometer between the second input of the wavelength selective filter and one of: the second input of the wavelength selective filter; and the single output of the wavelength selective filter.

29. An optical switch comprising:
    a controllable switch having a first input coupled to a first optical path and an output connected to the first optical path and a second input coupled to a termination of a second optical path, the controllable switch including a controllable device having a control input; and
    a controlling device having an input and an output connected to the control input of the controllable device, wherein said controllable switch at all times provides an unbroken optical pathway along the first optical path and wherein the controllable device under control of the controlling device enables and disables optical coupling between the termination of the second optical path and the first optical path depending upon a signal applied to the input of the controlling device.

30. An optical switch comprising:
    a controllable switch, and
    a controlling device having an input and an output,
    wherein said controllable switch is optically coupled to a first optical path and optically coupled to a termination of a second optical path, said controllable switch controlled by the controlling device to enable and disable optical coupling between the termination of the second optical path and the first optical path, and wherein the controllable switch further comprises:
    a wavelength selective filter,
    a controllable optical signal blocker having a signal input and a control input,
    a third optical path,
    wherein the signal input of the controllable optical signal blocker is optically coupled to said termination of the second optical path and the control input of the controllable optical signal blocker is connected to the output of the controlling device wherein the controllable signal blocker is controlled by said controlling device to allow and block signals from the second optical path to the third optical path, the third optical path optically coupled to the controllable optical signal blocker and a second input of the wavelength selective filter, the wavelength selective filter optically coupled to the first optical path by a first input and a single output.

31. An optical switch comprising:
    a controllable switch having a first input coupled to a first optical path and an output connected to the first optical path and a second input coupled to a termination of a second optical path, the controllable switch including a controllable device having a control input; and
    a controlling device having an input and an output connected to the control input of the controllable device, wherein the controllable device under control of the controlling device enables and disables optical coupling between the termination of the second optical path and the first optical path depending upon a signal applied to the input of the controlling device and wherein the second optical path is optically coupled to test equipment.

32. An optical switch comprising:
    a controllable switch, and
    a controlling device having an input and an output,
    wherein said controllable switch is optically coupled to a first optical path and optically coupled to a termination of a second optical path, said controllable switch controlled by the controlling device to enable and disable optical coupling between the termination of the second optical path and the first optical path, wherein the controlling device receives at its input, traffic information of said first optical path, for use in controlling the controllable switch, and wherein the controllable switch further comprises:
    a wavelength selective filter,
    a controllable optical signal blocker having a signal input and a control input,
    a third optical path,
    wherein the signal input of the controllable optical signal blocker is optically coupled to said termination of the second optical path and the control input of the controllable signal blocker is connected to the output of the controlling device wherein the controllable signal blocker is controlled by said controlling device to allow and block signals from the second optical path to the third optical path, the third optical path optically coupled to the controllable optical signal blocker and a second input of the wavelength selective filter, the wavelength selective filter optically coupled to the first optical path by a first input and a single output.

33. An optical switch comprising:
    a controllable switch having a first input coupled to a first optical path and an output connected to the first optical path and a second input coupled to a termination of a second optical path, the controllable switch including a controllable device having a control input; and
    a controlling device having an input and an output connected to the control input of the controllable device, wherein the controllable device under control of the controlling device enables and disables optical coupling between the termination of the second optical path and the first optical path depending upon a signal applied to the input of the controlling device, the signal being traffic information of said first optical path and wherein the second optical path is optically coupled to test equipment.

* * * * *

UNITED STATES PATENT AND TRADEMARK OFFICE
CERTIFICATE OF CORRECTION

PATENT NO. : 6,798,934 B2 Page 1 of 1
DATED : September 28, 2004
INVENTOR(S) : Simon P. Parry et al.

It is certified that error appears in the above-identified patent and that said Letters Patent is hereby corrected as shown below:

Column 11,
Line 6, after the sub-paragraph "a controllable switch, and" the sub-paragraph -- a controlling means… -- is missing.

Signed and Sealed this

Fourth Day of January, 2005

JON W. DUDAS
*Director of the United States Patent and Trademark Office*